(12) United States Patent
Shinohara

(10) Patent No.: US 7,365,790 B2
(45) Date of Patent: Apr. 29, 2008

(54) AUTOFOCUS SYSTEM FOR AN IMAGE CAPTURING APPARATUS

(75) Inventor: Junichi Shinohara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 10/796,036

(22) Filed: Mar. 10, 2004

(65) Prior Publication Data

US 2004/0240871 A1 Dec. 2, 2004

(30) Foreign Application Priority Data

Mar. 14, 2003 (JP) ............................. 2003-070393

(51) Int. Cl.
*G03B 13/00* (2006.01)
*H04N 5/232* (2006.01)

(52) U.S. Cl. ..................... 348/345; 348/348; 348/349; 396/125

(58) Field of Classification Search ................ 348/345, 348/348, 349, 353, 356; 396/106, 104, 125
See application file for complete search history.

(56) References Cited

U.S. PATENT DOCUMENTS

| | | | |
|---|---|---|---|
| 4,592,638 A * | 6/1986 | Kaneda et al. ................ | 396/80 |
| 5,070,356 A | 12/1991 | Nakamura et al. | |
| 5,150,143 A | 9/1992 | Ohno et al. | |
| 5,192,860 A | 3/1993 | Shinohara et al. | |
| 5,192,964 A | 3/1993 | Shinohara et al. | |
| 5,270,755 A | 12/1993 | Ohno et al. | |
| 5,293,034 A | 3/1994 | Ohno et al. | |
| 5,309,190 A | 5/1994 | Shinohara et al. | |
| 5,597,999 A | 1/1997 | Kinba et al. | |
| 5,682,563 A | 10/1997 | Shinohara et al. | |
| 6,366,736 B1 * | 4/2002 | Nonaka ....................... | 396/106 |
| 6,507,707 B2 * | 1/2003 | Nonaka ....................... | 396/108 |
| 6,704,054 B1 * | 3/2004 | Hashimoto ................... | 348/354 |
| 6,972,797 B2 * | 12/2005 | Izumi .......................... | 348/348 |
| 2001/0026683 A1 | 10/2001 | Morimoto et al. | |
| 2002/0149689 A1 | 10/2002 | Sannoh et al. | |
| 2003/0081137 A1 * | 5/2003 | Yamazaki ................... | 348/354 |

FOREIGN PATENT DOCUMENTS

| | | |
|---|---|---|
| JP | 11-23955 | 1/1999 |
| JP | 2001-255451 | 9/2001 |
| JP | 2001-255456 | 9/2001 |
| JP | 2004-157456 | 6/2004 |

* cited by examiner

*Primary Examiner*—Ngoc-Yen Vu
*Assistant Examiner*—Gregory V Madden
(74) *Attorney, Agent, or Firm*—Oblon, Spivak, McClelland, Maier & Neustadt, P.C.

(57) ABSTRACT

A digital camera 100 includes a photographic optical system (21) for projecting an image of a subject; a CCD (24) for converting the projected image into an image signal and outputting it; a focus driving system (25) which changes a focusing condition of the image projected to the CCD (24) by relatively moving at least one of the photographic optical system (21) and the CCD (24) to the other; a CCDAF portion (82) which sequentially evaluates the image signal obtained in each focusing condition while subsequently changes the focusing condition by controlling the focus driving system (25), and which obtains a predetermined focusing condition based on the evaluation; an AF controlling portion (83) for controlling an operation of the CCDAF portion (82); and a ranging sensor (31) for measuring a subject distance. In addition, the AF controlling portion (83) controls the operation of the CCDAF portion (82) according to the subject distance to prioritize either a focusing accuracy or a focusing speed.

5 Claims, 6 Drawing Sheets

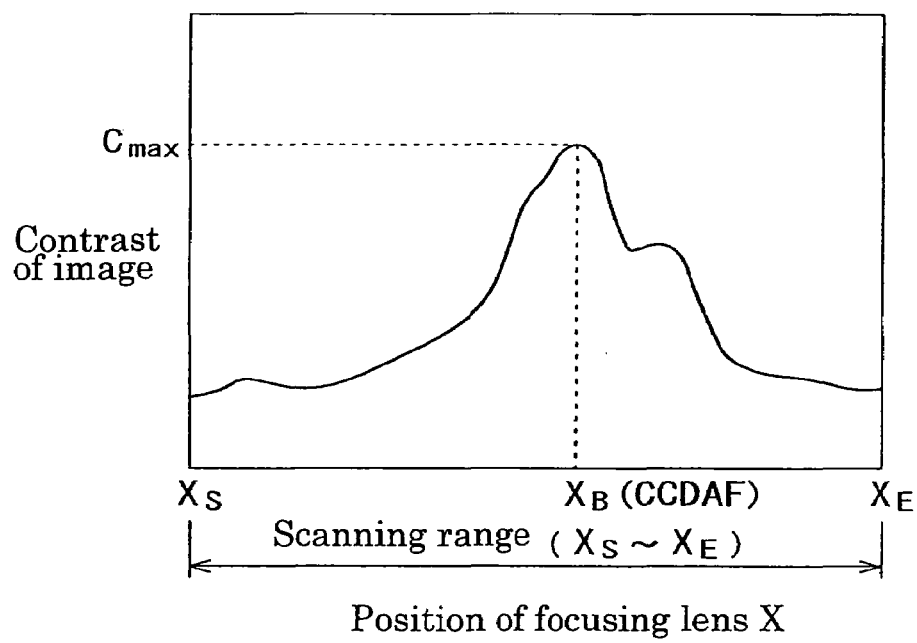
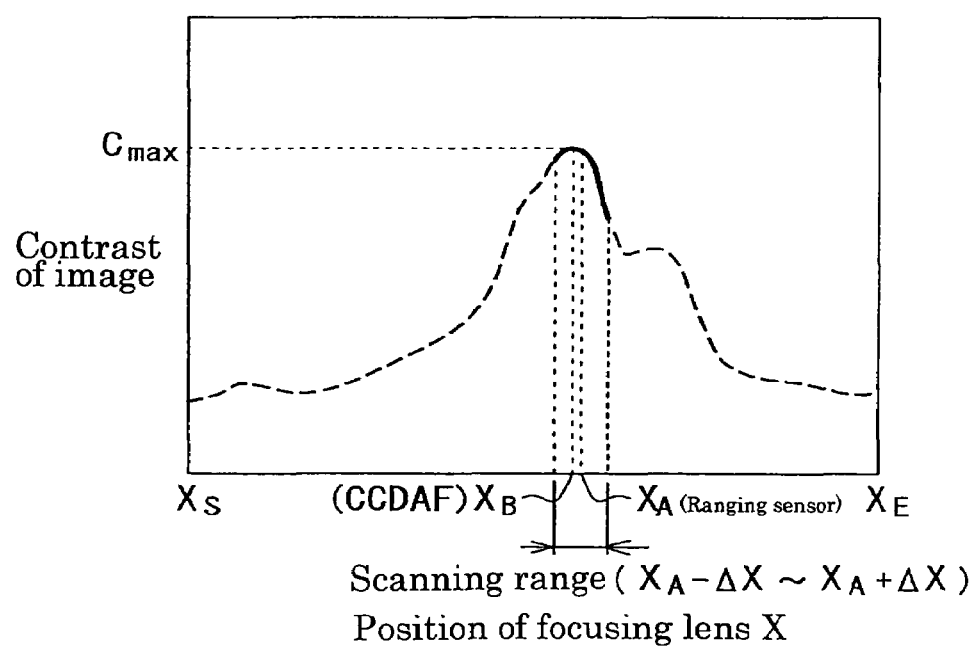

FIG.4A

Example of setting D1

| High image quality | Wide~ Mean | Mean~ Tele |
|---|---|---|
| Small aperture | 20cm | 10cm |
| Open aperture | 40cm | 20cm |

| Low image quality | Wide~ WM | MT~ Tele |
|---|---|---|
| Small aperture | 10cm | 5cm |
| Open aperture | 20cm | 10cm |

FIG.4B

Example of setting L1

| High image quality | Wide~ WM | WM~ Mean | Mean~ MT | MT~ Tele |
|---|---|---|---|---|
| Small aperture | 5m | 10m | 20m | ∞ |
| Open aperture | 3m | 5m | 10m | 30m |

| Low image quality | Wide~ WM | WM~ Mean | Mean~ MT | MT~ Tele |
|---|---|---|---|---|
| Small aperture | 20m | ∞ | ∞ | ∞ |
| Open aperture | 10m | 20m | 30m | ∞ |

AUTOFOCUS SYSTEM FOR AN IMAGE CAPTURING APPARATUS

BACKGROUND OF THE INVENTION

1. Field of the Invention

The present invention relates to an image inputting apparatus such as a camera device equipped with an AF device by a so-called contrast AF method.

2. Description of the Prior Art

Conventionally, an image inputting apparatus such as a still camera and a video camera is equipped with an AF (Auto Focusing) device for optimally adjusting a focusing condition of an image of a subject automatically.

An auto focusing device in a traditional image inputting apparatus that records the image of the subject to a recording medium such as a film and a video tape and the like as an image and a vision, is provided with a ranging device for obtaining a distance to the subject, and employs an AF which controls a focus driving device to move a lens to a focal position which corresponds to the distance obtained by the ranging device. Such AF is referred to as an outside light AF in contrast with a contrast AF, which will be described later.

The outside light AF is classified broadly into a passive AF and an active AF depending on a ranging method performed by the ranging device. In the passive AF, ranging is carried out based on a phase difference of a plurality of images of the subject projected on the ranging device by passing through an optical path which is different from an optical path passing trough a photographic optical system. In the active AF, for example a near-infrared ray or a supersonic wave or the like is radiated to the subject and ranging is carried out based on a time or an angle of a reflected wave from the subject to be returned to the ranging device.

Meanwhile, although there is a case in the active AF that the distance to the subject cannot be detected accurately since, for example, in a case of photographing the subject passing through a windowpane, the near-infrared ray and the like radiated to the subject is reflected by the windowpane, the passive AF is difficult to be influenced even by such case that the subject is pass through the windowpane. Therefore, there is a tendency that the passive AF is employed for an image inputting apparatus which accuracy is relatively required.

On the other hand, in a new image inputting apparatus such as a digital camera and the like which projects the subject image on an imaging device such as a CCD through the photographic optical system and retrieves the projected image of the subject as an electric signal, because an image signal of the subject image can be retrieved virtually simultaneously with the projection of the subject image onto the CCD, it is possible to perform an AF operation by utilizing this image signal.

More specifically, this AF moves a focusing lens of the photographic optical system, and evaluates contrast (such as sharpness of image) of the image projected on the imaging device in real-time based on the image signal at each time of the movement of the focusing lens while the focusing lens is moved, and stops the movement of the photographic optical system at a position where a value of this evaluation becomes greatest. This AF is referred to as the contrast AF, and is also referred to as a CCDAF in which the CCD is used as the imaging device.

The contrast AF has a characteristic that a focusing accuracy is extremely high, since the contrast AF is carried out by evaluating the image which is projected actually onto the imaging device rather than obtaining the distance to the subject.

In addition, since the contrast AF is carried out by comparing the evaluation values in each moving position of the focusing lens while moving the focusing lens, it is possible to improve the focusing accuracy if more repeated numbers of a series of operations which include accumulation of the images, transferring thereof, computation of the evaluation values and comparing of the computed values, are carried out.

On the other hand, there is a problem that a time required for a determination of a focusing position (completion of the AF operation) becomes long, if the many operations are repeated. Under the circumstance that the time required from the beginning of the AF operation to the completion of the AF operation, namely, a time-lag influences significantly on a focusing operation, and accordingly, in a case of photographing the subject which is moved at high speed for example, there may be a case that the photographing cannot be performed with a desired timing.

Also, in the contrast AF, a significant difference does not occur in the evaluation value in a dark circumstance where the entire contrast is low, and thus there is even a case that the appropriate focusing operation cannot be performed.

On the contrary, although the outside light AF is inferior to the contrast AF in terms of the focusing accuracy, the outside light AF can follow well to a dynamic subject since the time-lag required for the AF operation is less, therefore, loss of timing for the photographing can be avoided.

In addition, the outside light AF has a characteristic that the outside light is generally difficult to be influenced by the contrast of the subject.

Therefore, there is proposed in Japanese Patent Laid Open No. 2001-255456 a hybrid AF (HBAF) provided with the AF device for performing an operation of the outside light AF and the AF device for performing an operation of the contrast AF as mentioned above, and capable of alternatively changing over both the outside light AF and the contrast AF operations according to a photographing situation and the like.

In addition, the Applicant of the present application has also proposed in unpublished Japanese Patent Application Nos. 2002-175297 and 2002-231065 a HBAF capable of changing over to the contrast AF under a predetermined condition while based on the outside light AF within a range of a normal photographing operation.

By the way, a range which a certain resolution can be obtained is judged as an allowable range of focusing in the image inputting apparatus, and the range which the certain resolution can be obtained is decided by a width of a difference between a CCD surface and an actual imaging surface. More specifically, the image inputting apparatus controls the different width between the CCD surface and the actual imaging surface so as to obtain the resolution. In practice, the image inputting apparatus is adapted to adjust the different width between the CCD surface and the actual imaging surface by moving the focusing lens.

FIGS. 6 and 7 are diagrams to explain the control of the different width between the CCD surface and the actual imaging surface in this image inputting apparatus. FIG. 6 shows a case in which the subject is in a long distance from the image inputting apparatus, and FIG. 7 shows a case in which the subject is in a short distance from the image inputting apparatus. Here, since a depth of image plane (an allowable range of the difference between the CCD surface and the actual imaging surface) is same in both cases that the subject is in the long distance and the subject is in the short distance from the image inputting apparatus, and a width of movement of the focusing lens that corresponds to the adjustment of the difference width between the CCD surface and the actual imaging surface in the both cases is also virtually the same in both cases that the subject is in the long distance and the subject is in the short distance from the image inputting apparatus, a relation of X1≈X2 is established between a width of movement X1 of the focusing lens in the case of the long distance and a width of movement X2 of the focusing lens in the case of the short distance.

Therefore, it can be said that the focusing accuracy does not change in the case of the long distance and even in the case of the short distance, theoretically.

However, a distance from a position of the subject to a focused position when the different width between the CCD surface and the actual imaging surface is the same differs greatly between the case of the long distance and the case of the short distance. More specifically, as shown in a middle drawing of FIG. 6, in the case of the long distance, the distance from the position of the subject to the focused position is Δ1 when the different width between the CCD surface and the actual imaging surface is δ1. On the other hand, in the case of the short distance, as shown in middle diagram of FIG. 7, the distance from the position of the subject to the focused position is Δ2 when the different width between the CCD surface and the actual imaging surface is δ2 (=δ1). Therefore, a relation of Δ1 >>>Δ2 is established. More specifically, it can be said that a depth of field to a certain depth of image plane is deeper in the case of the long distance compared with the case of the short distance.

In a concrete example, when the photographing is performed by a telescopic lens, although in the case of the long distance, the depth of field corresponding to a certain depth of image plane is, for example 16 m–30 m and thus there is a width of 14 m, in the case of the short distance, the depth of field is, for example 0.6 m–0.613 m and thus there is a width of only 0.013 m. This means that, for example, a situation that a tree quite in front of a subject becomes in focus when a building in 30 m ahead is set as the subject, and a situation that bangs of a person in 0.613 m ahead become in focus rather than eyes of that person becomes in focus when the person in 0.613 m ahead is set as the subject, occur by the same difference width between the CCD surface and the actual image plane.

In these situations, it can be said that the width of movement of the focusing lens is virtually the same as long as the different width between the CCD surface and the actual imaging surface is the same, thus the focusing accuracy between the case of the long distance and the case of the short distance is recognized as the same in the image inputting apparatus.

However, these situations are difficult to be recognized as the same focusing accuracy from sensitivity of a user viewing actually photographed photos. More specifically, under the same focusing accuracy, although it is merely recognized by the user that the case of the short distance is slightly out of focus by a sensation, there is a problem that the case of the long distance is recognized as evidently out of focus.

In addition, in a case that a subject is mixed with the long distance and the short distance from the image inputting apparatus, in terms of a fact that it is difficult to avoid the focusing to be more or less out of focus since judging primarily where to focus optimally in such case is difficult, it can be said that a range of being recognized as in focus by the sensation of the user is broad compared with the subject in a certain distance (single distance).

As stated above, the sensation that the user actually feels varies among the case that the subject is in the short distance and the case that the subject is in the long distance from the image inputting apparatus, and furthermore the case that the subject is in the certain distance and the case that the subject is mixed with the long and the short distances from the image inputting apparatus, even the focusing accuracy is the same.

SUMMARY OF THE INVENTION

The present invention has been made in view of the above-mentioned circumstances. Therefore, it is an object of the present invention to provide an image inputting apparatus capable of carrying out an AF operation, which appropriately acquires accuracy according to a distance to a subject or a distance to each area of the subject.

To accomplish the above mentioned object, an image inputting apparatus according to the present invention comprises a photographic optical system for projecting an image of a subject; an imaging device for converting the projected image into an image signal and outputting it; a focus driving device which changes a focusing condition of the image projected to the imaging device by relatively moving at least one of a part or an entire of the photographic optical system and the imaging device to the other; a first auto focusing device which sequentially evaluates the image signal obtained in each focusing condition while subsequently changes the focusing condition by controlling the focus driving device, and which obtains a predetermined focusing condition based on the evaluation; a controlling device for controlling an operation of the first auto focusing device; and a ranging device for measuring a subject distance, which is a distance to the subject.

The controlling device controls the operation of the first auto focusing device according to the subject distance obtained by the ranging device to prioritize either a focusing accuracy or a focusing speed.

Here, the image inputting apparatus includes various imaging devices such as an electronic still camera and a video camera similar to the electronic still camera, and a device which images the image of the subject by operating a shutter, and so on.

In addition, the imaging device stands for a solid-state imaging device such as a CCD and a CMOS and the like, and an imaging sensor in which other photoelectric converting device and the like is arranged, and means a device which can retrieve the projected image as an image signal such as an electric signal in virtually real-time.

The photographic optical system stands for an optical system such as a group of focusing lenses which projects the image of the subject to the imaging device and images the image, and a photographic optical system provided with an optical system such as a group of zooming lenses incrementally is also included therein.

The ranging device may be a module used for an active AF, or may be a module used for a passive AF.

At least one of the part or entire of the photographic optical system and the imaging device stands for one of following five conditions, and the conditions can be selected according to composition of the photographic optical system and the imaging device, the conditions are:
1. only part of the photographic optical system,
2. only entire of the photographic optical system,
3. only the imaging device, 4. part of the photographic optical system and the imaging device, and
5. entire of the photographic optical system and the imaging device.

Also, sequentially evaluating the image signal means to obtain a value (such as a derivative value of the image signal) corresponding to the focusing condition of the subject image, that is for example, contrast and sharpness of the subject image, on the each image signal obtained in each focusing condition, and obtain a maximum value or a greatest value between the obtained each value.

More specifically, for example, the sharpness of the subject image can be represented by the derivative value of the image signal on a profile area of the subject, and it can be said that the subject image is in a condition appropriately imaged on the imaging device, that is, in a condition of in focus, when the derivative value becomes the greatest.

Therefore, the first auto focusing device is a device which controls the focus driving device by a so-called contrast AF (CCDAF) operation.

Controlling the operation of the first auto focusing device may be to control a content of the operation of the first auto focusing device itself, and in a case of an image inputting apparatus provided with other auto focusing device which is different to the first auto focusing device in a kind of auto focusing operation, it may be to control switching over to switch over between the operation of the first auto focusing device and the operation of the other auto focusing device.

According to the present invention, by the controlling device controlling the operation of the first auto focusing apparatus pursuant to the subject distance obtained by the ranging device, the operation of the first auto focusing device is controlled according to the distance from the image inputting apparatus to the subject, thus the AF operation by the first auto focusing device can be carried out with an appropriate accuracy.

BRIEF DESCRIPTION OF THE DRAWINGS

FIG. 2A is a diagram representing an example of a relation between a scanning range of a focusing lens and a contrast C in a CCDAF operation, and is representing a case which the scanning range is set as an entire range of a movable range (XS-XE).

FIG. 2B is a diagram representing an example of the relation between the scanning range of the focusing lens and the contrast C in the CCDAF operation, and is representing a case which the scanning range is set as a range which is limited (XA−ΔX−XA+ΔX).

FIG. 4A is a diagram representing a reference table which a zooming position, an aperture number and an image quality mode are corresponded to each other, as an example of setting of a predetermined value D1.

FIG. 4B is a diagram representing a reference table which the zooming position, the aperture number and the image quality mode are corresponded to each other, as an example of setting of a predetermined distance L1.

DETAILED DESCRIPTION OF THE PREFERRED EMBODIMENTS

Hereinafter, embodiments of the present invention will be described with reference to the accompanying drawings.

Figure 1:
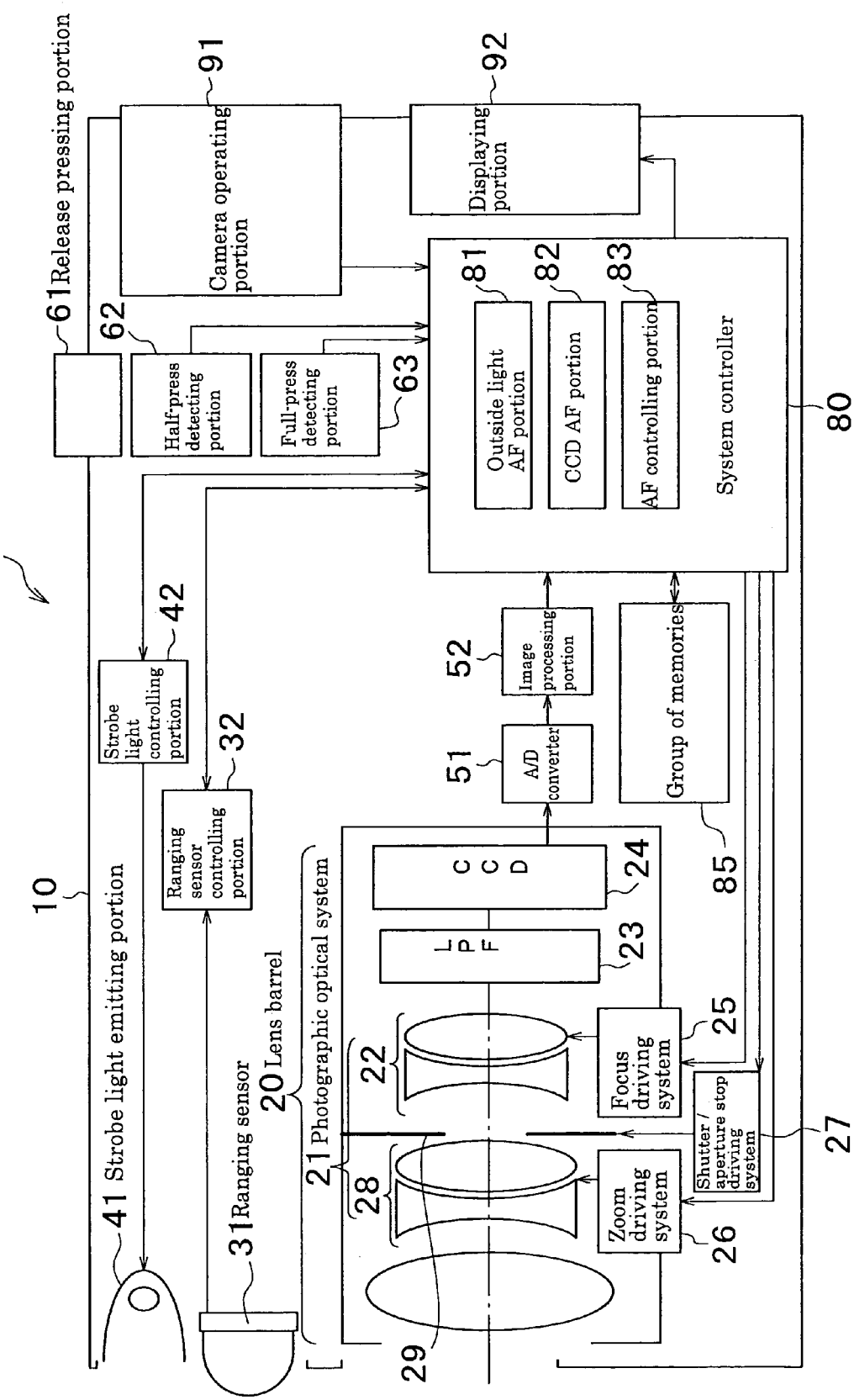
FIG. 1 is a block diagram representing a digital camera corresponding to an embodiment of the present invention.

FIG. 1 is a block diagram representing a digital camera as an image inputting apparatus corresponding to embodiments of the present invention.

Inside of a chassis 10 of a digital camera 100 shown in FIG. 1, a camera operating portion 91, a displaying portion 92, a strobe light emitting portion 41, a lens barrel unit 20, a system controller 80, a release pressing portion (shutter release button) 61, and a ranging sensor 31 (ranging means) as a ranging device and the like are contained.

The lens barrel unit 20 is provided with a photographic optical system 21, a CCD (imaging means) 24 as an imaging device which is an imaging element on which an image of a subject entered through the photographic optical system 21 is projected, and a low pass filter (LPF) 23 arranged between the photographic optical system 21 and the CCD 24. Furthermore, the lens barrel unit 20 is provided with a focus driving system (focus driving means) 25 as a focus driving device which moves a group of focusing lenses 22 in the photographic optical system 21 to a direction of an optical axis, a zoom driving system 26 which moves a group of zooming lenses 28 in the photographic optical system 21 to the direction of the optical axis, an aperture stop 29 arranged between the group of zooming lenses 28 and the focusing lens 22, and a shutter/aperture stop driving system 27 for adjusting degree of opening (aperture number, for example, open and small aperture and the like) of the aperture stop 29.

Here, a distance of movement ΔX of the group of focusing lenses 22 is set corresponding to number of pulses M which oscillates with a predetermined frequency, and the distance of movement ΔX becomes greater as the number of pulses M becomes greater.

An A/D converter 51 to digitalize an electric signal outputted from the CCD 24 is connected to the CCD 24. Also, an image processing portion 52 which performs signal processing to a digitalized image signal is connected to the A/D converter 51, and a digital signal which the signal processing is processed in the image processing portion 52 is structured to be inputted into the system controller 80.

The strobe light emitting portion 41 is connected through a strobe light controlling portion 42 to the system controller 80.

Provided in the release pressing portion 61 a half-press detecting portion 62 for detecting a half-press condition in a half-press position and a full-press position of the release pressing portion 61, and a full-press detecting portion 63 for detecting a full-press condition of the release pressing portion 61 in a full-press position of the release pressing portion 61.

In addition, these half-press detecting portion 62 and the full-press detecting portion 63 are connected to the system controller 80 respectively, and a detection signal of the half-press condition (instruction for starting an AF operation) is structured to be inputted into the system controller 80, and a detection signal of the full-press condition (instruction for executing photographing) is structured to be inputted into the system controller 80.

The camera operating portion 91 is for an user to perform various settings or the like such as selecting a function, and is structured by a button and the like. In particular, the camera operating portion 91 includes a zooming button for setting a zooming position (angle of field) of the group of zooming lenses 28 (for example, Tele-MT-Mean-WM-Wide), and a button of an image quality mode for setting the image quality mode (for example, low image quality, high image quality and the like) which changes the image quality by, such as, number of imaging pixels and image compression rate, and the like.

On the displaying portion 92, a visible image which the digital signal processed with the signal processing in the image processing portion 52 and inputted into the system controller 80 represents, and various information set in the camera operating portion 91 and the like, are displayed.

The ranging sensor 31 is a sensor which obtains a distance to the subject for an outside light AF operation which will be described later, and is connected through a ranging sensor controlling portion 32 to the system controller 80.

A group of memories 85 is connected to the system controller 80, and this group of memories 85 includes a memory such as a Smart Media and a Compact Flash (registered trademark) which are provided to be attachable and detachable to the chassis 10 with a condition of storing a digital signal which represents a photographed image.

In addition, a flash memory which rewritably and temporarily stores information on the setting set in the camera operating portion 91 and information sent from the system controller 80, and a ROM in which information is written and which is incapable of being rewritten, are also included in the group of memories 85.

Meanwhile, a predetermined value D1 which is a value of a difference between a maximum value of a distance to each area of the subject and a minimum value of the distance to the each area of the subject that distinguishes between a range which the subject is in a condition of mixed with a long distance and a short distance from the digital camera 100 and a range which the subject is in a certain distance (range that the subject is not in the condition of mixed with the long and the short distances) from the digital camera 100, and a predetermined distance L1 which distinguishes between a long distance range and a short distance range of the subject in relation to a subject distance, and the like are configured to be stored into the flash memory after being set in step 4 (#4) which will be described later by the system controller 80.

Here, the predetermined distance L1 (predetermined distance which is set previously) stands for a value of a distance which distinguishes between the range which a high focusing accuracy is required, that is, the long distance range, and a range which the high focusing range is not necessarily required, that is, the short distance range, in relation to the subject distance.

In particular, if the predetermined distance (previously set predetermined distance) is L1, the range which the high focusing accuracy is not necessarily required is the short distance range ($0 \leq L < L1$) which is from a position of the digital camera (image inputting apparatus) 100 ($L=0$) to a position a short distance away from the position of the digital camera 100 ($L<L1$). Moreover, if the predetermined distance (previously set predetermined distance) is L1, the range which the high focusing accuracy is required is the long distance range ($L1 \leq L$) which is as a position a long distance away from the position of the digital camera 100 that is over the short distance range.

Also, a result of whether or not the subject is in the condition of mixed with the long and the short distances is obtained based on the distance to the each area of the subject obtained by the ranging sensor (ranging device) 31. For example, if a value of a difference between a maximum value and a minimum value in a plurality of distances to the each area obtained by the ranging sensor 31 is more than the predetermined value D1 which is set previously, it is determined that the object is in the condition of mixed with the long and the short distances. If the value of the difference is less than the predetermined value D1, it is determined that the subject is not in the condition of mixed with the long and the short distances. Here, the predetermined value D1, which is set previously, stands for the value of the difference between the maximum value of the distance to the each area of the subject and the minimum value of the distance to the each area of the subject that distinguishes between the range that the subject is in the condition of mixed with the long and the short distances and the range that the subject is in the certain distance from the digital camera 100 (range that the subject is not in the condition of mixed with the long and the short distances). Alternatively, a presence or an absence of the subject mixed with the long and the short distances may be judged by using an extent of distribution of the distance to the each area (for example, a value or the like which is equivalent to dispersion of the subject distance). In these cases, it is not necessary to use all the distances to the each area obtained by the ranging sensor 31. It is desired to use only the distance to the each area, which is at surrounding of a center of the subject.

Moreover, the system controller 80 includes an outside light AF portion (second auto focusing means) 81 as a second auto focusing device, a CCDAF portion (first auto focusing means) 82 as a first auto focusing device, and an AF controlling portion (controlling means) 83 as a controlling device.

The AF controlling portion 83 carries out controlling of switching over between the outside light AF operation operated by the outside light AF portion 81 and a CCDAF operation operated by the CCDAF portion 82 according to the detection of the half-press condition of the release pressing portion 61 detected by the half-press detecting portion 62, the detection of the full-press condition detected by the full-press detecting portion 63, and the detections of these half-press condition and the full-press condition after the detection of the half-press condition.

The outside light AF portion 81 is an AF portion which controls the focus driving system 25 so as to allow the focus driving system 25 to move the group of focusing lenses 22 to a position where corresponds to the distance to the subject (the subject distance) inputted from the ranging sensor 31 through the ranging sensor controlling portion 32.

Also, the outside light AF portion 81 controls the focus driving system 25 so as to allow the focus driving system 25 to move the group of focusing lenses 22 to a constant focal position when the ranging of the subject distance by the ranging sensor 31 is not appropriately performed.

Here, the second auto focusing device as the outside light AF portion 81 may be a device which controls the focus driving system (focus driving device) 25 so as to directly obtain a predetermined focusing condition based on the distance obtained by the ranging sensor (ranging device) 31. For example, the second auto focusing device may be an auto focusing device which performs the so-called outside light AF operation.

More specifically, the second auto focusing device directly calculates a distance between the photographic optical system 21 and the CCD (imaging device) 24 necessary for the image of the subject which corresponds to the subject distance to be imaged on the CCD 24 with the predetermined focusing condition, on the basis of the subject distance obtained by the ranging sensor 31, and controls the focus driving system 25 so that the distance between the photographic optical system 21 and the CCD 24 becomes the calculated distance.

On the other hand, the CCDAF portion 82 is an AF portion which sequentially evaluates the digital signal which is projected on the CCD 24 through the group of focusing lenses 22 and the LPF 23 and inputted into the system controller 80 while moves the group of focusing lenses 22, and controls the focus driving system 25 so as to allow the focus driving system 25 to stop the group of focusing lenses 22 at a focusing position based on the evaluation.

More specifically, as shown in FIG. 2A, the CCDAF portion 82 carries out a CCDAF which calculates a contrast C of the subject image in each position of the group of focusing lenses 22 while moves the group of focusing lenses 22 in an entire range (XS-XE) of a movable range of the group of focusing lenses 22 as a scanning range, decides a position XB where a maximum contrast C max can be obtained as a position of a most appropriate focusing condition, that is, the focusing position, after scanning the entire range, and controls the focus driving system 25 so as to allow the focus driving system 25 to move the group of focusing lenses 22 again to the position XB. However, the scanning range of the group of focusing lenses 22 is limited by the AF controlling portion 83 of the system controller 80 compared with the entire range of the movable range of the group of focusing lenses 22.

More specifically, as shown in FIG. 2B, the AF controlling portion 83 calculates a position XA (a position which complies with the subject distance) of the group of focusing lenses 22 which corresponds to the distance to the subject (the subject distance) obtained by the ranging sensor 31, and when to carry out the above mentioned CCDAF, sets a scanning range (XA−ΔX−XA+ΔX) of ±ΔX as a peripheral focusing range by setting the position XA which complies with the subject distance as a center, and controls the CCDAF portion 82 so that the CCDAF portion 82 determines the peripheral focusing range as the scanning range of the group of focusing lenses 22.

The above mentioned scanning range (XA−ΔX−XA+ΔX) which the AF controlling portion 83 sets varies according to a result of a judgment of whether the ranging in step 5 (#5), which will be described later, is performed appropriately or not.

Figure 3:
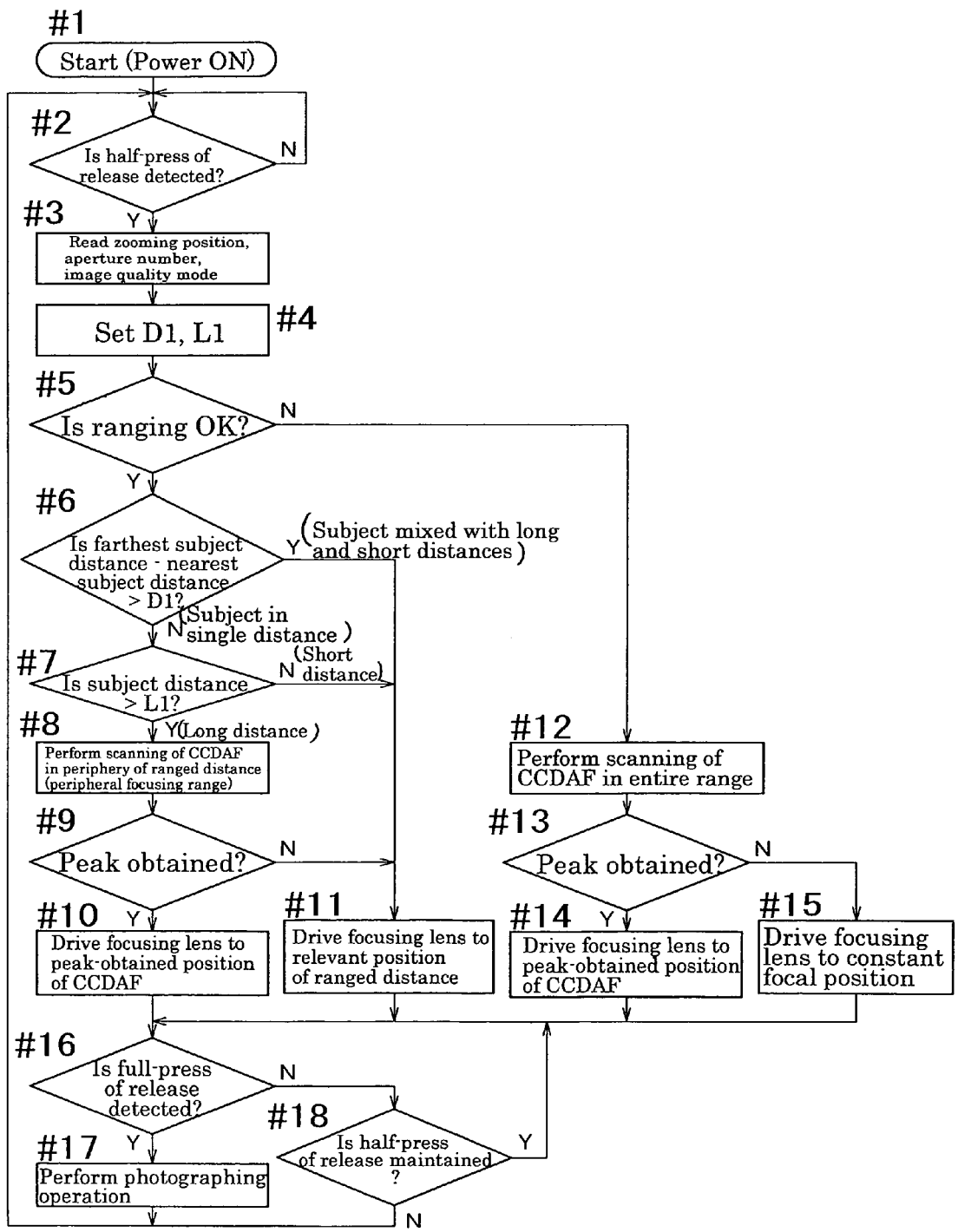
FIG. 3 is a flowchart representing a process of AF controlling and executing of photographing in the digital camera of the embodiment.

Next, an operation of the digital camera 100 according to the present embodiment will be described with referring to a flowchart represented in FIG. 3.

First of all, a power which is not shown of the digital camera 100 is switched to "ON" by the user of the digital camera 100, and a preparation for photographing is prepared by the user (#1).

Subsequently, the photographic optical system 21 is directed to the subject which is not shown, and the release pressing portion 61 is pressed to perform the photographing. Meanwhile, when to carry out zooming of the subject if necessary, the camera operating portion 91 is operated so that the zoom driving system 26 is controlled by the system controller 80 and thus the group of zooming lenses 28 is driven by the zoom driving system 26.

Here, at a time when the release pressing portion 61 is pressed to the half-press position (#2), the half-press detecting portion 62 detects that the release pressing portion 61 is pressed to the half-pressed position, and the half-pressed detecting portion 62 outputs a starting signal which represents the instruction for starting the AF operation to the system controller 80.

The AF controlling portion 83 of the system controller 80 reads the zooming position of the group of zooming lenses 28, the degree of opening (the aperture number) of the aperture stop 29 and the image quality mode set by the camera operating portion 91 (#3).

Subsequently, the AF controlling portion 83 sets the predetermined value D1 and the predetermined distance L1 based on the read zooming position, the aperture number and the image quality mode, and stores the predetermined value D1 and the predetermined distance L1 into the flash memory (#4). Meanwhile, the AF controlling portion 83 obtains the predetermined value D1 and the predetermined distance L1 by, for example, referring to reference tables represented in FIGS. 4A and 4B which the zooming position, the aperture number and the image quality mode are previously corresponded to each other and which are stored in the ROM.

By the way, it should be understood that the predetermined value D1 and the predetermined distance L1 which are obtained from the read zooming position, the aperture number and the image quality mode, are not limited by numeric values represented in FIGS. 4A and 4B.

Moreover, the AF controlling portion 83 in which the starting signal is inputted controls the outside light AF portion 81 so as to allow the outside light AF portion 81 to carry out the ranging operation.

By this controlling of the outside light AF portion 81 by the AF controlling portion 83, the outside light AF portion 81 controls the ranging sensor controlling portion 32 to operate the ranging sensor 31.

In addition, the outside light AF portion 81 controls the strobe light controlling portion 42 simultaneously with the controlling of the ranging sensor controlling portion 32 to emit a light of the strobe light as an outside light for the ranging from the strobe light emitting portion 41.

A reflected light of the strobe light is emitted from the subject received the strobe light, and the reflected light is inputted into the ranging sensor 31. Then, the ranging sensor controlling portion 32 calculates, by a principle of triangular surveying, the subject distance and the distance to the each area of the subject at a plurality of different areas of the subject.

The subject distance and the distance to the each area are inputted through the outside light AF portion 81 to the AF controlling portion 83.

On the other hand, there may be a case that the ranging cannot be carried out appropriately when the subject has, for example, such repeated patterns that the distance cannot be calculated appropriately by the principle of the triangular surveying. In such case, a signal of "ranging inappropriate" is inputted from the ranging sensor controlling portion 32 through the outside light AF portion 81 into the AF controlling portion 83.

At this time, the AF controlling portion 83 judges whether the ranging is performed appropriately or not (#5).

When the ranging is performed appropriately, the position XA where complies with the subject distance of the group of focusing lenses 22 which corresponds to the inputted subject distance, is obtained by referring to the reference table which the subject distance and the position of the group of focusing lenses 22 are previously corresponded to each other and which is stored in the ROM, and the obtained position XA is stored into the flash memory.

The AF controlling portion 83 judges whether or not the value of the difference between the maximum value (farthest subject distance) and the minimum value (nearest subject distance) within the plurality of distances to the each area is more than the predetermined value D1 (#6).

When the value of the difference between the maximum value and the minimum value is less than the predetermined value D1, the AF controlling portion 83 determines that the subject is not in the condition of mixed with the long and short distances (more specifically, the subject is in a single distance from the digital camera 100), and thus judges whether or not the subject distance is more than the predetermined distance L1 (#7).

When the subject distance is more than the predetermined distance L1, the AF controlling portion 83 determines that the subject is in the long distance, and controls the CCDAF portion 82 so as to allow the CCDAF portion 82 to perform the CCDAF operation.

The CCDAF portion 82 outputs a command to the focus driving system 25 to move the group of focusing lenses 22 to the position XA (the position of the group of focusing lenses 22 obtained by the ranging operation) where complies with the subject distance stored in the flash memory. The focus driving system 25 performs driving which moves the group of focusing lenses 22 to the position XA (relevant position of ranged distance) where complies with the commanded subject distance.

The CCDAF portion 82 evaluates the contrast C of the image projected onto the CCD 24 based on the image signal as the CCDAF portion 82 moves the group of focusing lenses 22 at a periphery of the position XA (peripheral focusing range) where complies with the commanded subject distance as an operation starting position of the group of focusing lenses 22 (#8).

When the maximum value (peak) C max of the contrast C is obtained (#9), the CCDAF portion 82 outputs a command to the focus driving system 25 to move the group of focusing lenses 22 to the position XB where the maximum value C max of the contrast C is obtained. The focus driving system 25 performs driving which moves the group of focusing lenses 22 to the position XB where commanded by the CCDAF portion 82 (#10).

On the other hand, when one of cases that the value of the difference between the maximum value and the minimum value within the plurality of distances to the each area is more than the predetermined value D1 in step 6 (#6) (the case which the subject is in the condition of mixed with the long and the short distances), or the subject distance is less than the predetermined distance L1 in step 7 (#7) (the case that the subject is in short distance), or the maximum value C max of the contrast C cannot be obtained in step 9 (#9), the AF controlling portion 83 controls the outside light AF portion 81 to allow the outside light AF portion 81 to carry out the outside light AF operation, to prioritize a focusing speed or due to a reason that it is impossible to obtain the most appropriate focusing condition by the CCDAF operation.

The outside light AF portion 81 outputs a command to the focus driving system 25 to move the group of focusing lenses 22 to the position XA (the position of the group of focusing lenses 22 obtained by the ranging operation) where complies with the subject distance stored in the flash memory. The focus driving system 25 performs driving which moves the group of focusing lenses 22 to the position XA where complies with the commanded subject distance.

In addition, when the ranging is not carried out appropriately in step 5 (#5), the AF controlling portion 83 controls the CCDAF portion 82 to allow the CCDAF portion 82 to perform the CCDAF operation. The CCDAF portion 82 outputs a command to the focus driving system 25 to move the group of focusing lenses 22 throughout the entire range (XS-XE) of the movable range of the group of focusing lenses 22. The focus driving system 25 performs driving which moves the group of focusing lenses 22 at the entire range of the movable range of the group of focusing lenses 22 where commanded by the CCDAF portion 82.

The CCDAF portion 82 evaluates the contrast C of the image projected onto the CCD 24 based on the image signal as the CCDAF portion 82 moves the group of focusing lenses 22 (#12).

When the maximum value (peak) C max of the contrast C is obtained (#13), the CCDAF portion 82 outputs the command to the focus driving system 25 to move the group of focusing lenses 22 to the position XB where the maximum value C max of the contrast C is obtained. The focus driving system 25 performs the driving which moves the group of focusing lenses 22 to the position XB where commanded by the CCDAF portion 82 (#14).

On the other hand, when the maximum value C max of the contrast C cannot be obtained, the AF controlling portion 83 controls the outside light AF portion 81 to allow the outside light AF portion 81 to perform the outside light AF operation, since it is impossible to obtain the most appropriate focusing condition by the CCDAF operation. The outside light AF portion 81 outputs a command to the focus driving system 25 to move the group of focusing lenses 22 to the constant focal position (a position where a depth of field becomes deep) stored in the ROM previously. The focus driving system 25 performs driving which moves the group of focusing lenses 22 to the constant focal position where commanded by the outside light AF portion 81 (#15).

As described above, after the movement of the group of focusing lenses 22 in each step 10 (#10), step 11 (#11), step 14 (#14) or step 15 (#15) is completed, the position where the movement of the group of focusing lenses 22 is completed (the position XA, the position XB or the constant focal position) is determined as the focusing position, and when the detection of the full-pressing of the release pressing portion 61 is not detected from the full-press detecting portion 63 (#16), the system controller 80 confirms to the half-press detecting portion 62 of whether the half-press condition of the release pressing portion 61 is maintained or not (#18).

If the half-pressed condition is not maintained, the process is returned to step 2 (#2) since it is in a condition that the release pressing portion 61 is not pressed at all and thus results that the operation of preparing for the photographing itself is cancelled.

On the other hand, when the half-press condition is maintained, the process is returned to step 16 (#16).

In addition, when the full-pressing of the release pressing portion 61 is detected (#16), it results that the photographing operation is executed, and therefore the system controller 80 carries out controlling to execute the photographing operation at the position where the group of focusing lenses 22 is located (#17), and the subject image which is projected on the CCD 24 is photo-electrically converted. Then, the subject image is turned into the digital signal by the A/D converter 51, and a predetermined signal processing is applied to the digital signal of the subject image by the image processing portion 52. Furthermore, the digital signal processed with the predetermined signal processing by the image processing portion 52 is inputted into the system controller 80, stored into the detachable memory as the digital image signal, and the process is returned to step 2 (#2).

In the digital camera 100 according to this embodiment, the operation of the CCDAF portion 82 is controlled in pursuant to the distance from the digital camera 100 to the subject by the AF controlling portion 83 controlling the operation of the CCDAF portion 82 in compliance with the subject distance obtained by the ranging sensor 31. Accordingly, the AF operation carried out by the CCDAF portion 82 can be performed with an appropriate accuracy.

For example, because the AF controlling portion 83 carries out the switching over between the operation of the CCDAF portion 82 and the operation of the outside light AF portion 81 according to the subject distance obtained by the ranging sensor 31, the operation is switched over to the operation of the CCDAF portion 82 which is high in the focusing accuracy to perform a contrast AF operation in the case that the subject is in the long distance from the digital camera 100 and thus the high focusing accuracy is required. On the other hand, in the case that the subject is in the short distance from the digital camera 100 and thus the high focusing accuracy is not necessarily required, the operation is switched over to the operation of the outside light AF portion 81 to perform the outside light AF operation. Accordingly, it is possible to carry out the AF operation which appropriately acquires the accuracy in accordance with the subject distance.

Particularly, by operating the CCDAF portion 82 which is high in the focusing accuracy when the subject distance is more than the previously set predetermined distance L1 and by operating the outside light AF portion 81 which is fast in the focusing speed when the subject distance is less than the predetermined distance L1, it is possible to carry out the AF operation with the appropriate accuracy which meets with a requirement in a range that the high focusing accuracy is required as well as a requirement in a range that the high focusing accuracy is not necessarily required. Accordingly, it is possible to balance the focusing accuracy with the focusing speed.

Furthermore, by the AF controlling portion 83 controlling the operation of the CCDAF portion 82 based on the plurality of distances to the each area obtained by the ranging sensor 31, the operation of the CCDAF portion 82 is controlled according to the presence or the absence of the subject which is mixed with the long and the short distances. Accordingly, the AF operation carried out by the CCDAF portion 82 can be performed with the appropriate accuracy.

For example, because the AF controlling portion 83 carries out the switching over between the operation of the CCDAF portion 82 and the operation of the outside light AF portion 81 according to the presence or the absence of the subject mixed with the long and the short distances, the operation is switched over to the operation of the CCDAF portion 82 which is high in the focusing accuracy to perform the contrast AF operation in the case that the subject is not in the condition of mixed with the long and the short distances and thus the high focusing accuracy is required. On the other hand, in the case that the subject is in the condition of mixed with the long and the short distances and thus the high focusing accuracy is not necessarily required, the operation is switched over to the operation of the outside light AF portion 81 to perform the outside light AF operation. Accordingly, it is possible to carry out the AF operation which appropriately acquires the accuracy according to the subject distance.

Particularly, by operating the CCDAF portion 82 which is high in the focusing accuracy when the subject is not in the condition of mixed with the long and the short distances and by operating the outside light AF portion 81 which is fast in the focusing speed when the subject is in the condition of mixed with the long and the short distances, it is possible to carry out the AF operation with the appropriate accuracy which meets with the requirement in the range that the high focusing accuracy is required as well as the requirement in the range that the high focusing accuracy is not necessarily required. Accordingly, it is possible to balance the focusing accuracy with the focusing speed.

Furthermore, because the zooming position (the angle of field), the aperture number and an imaging image quality (the image quality mode) are provided to be variable, and the predetermined distance L1 and the predetermined value D1 are provided to be capable of being obtained corresponding to the zooming position, the aperture number and the imaging image quality respectively, the AF operation can be carried out with the appropriate accuracy in accordance with setting conditions of the zooming position, the aperture number and the imaging image quality. Regarding the zooming position, for example when a vicinity of "Wide" which defocusing tends to be conspicuous is set for the zooming position, it is possible to place emphasis on the focusing accuracy rather than the focusing speed by carrying out the AF operation which the focusing accuracy is emphasized more compared with a case that a vicinity of "Tele" is set for the zooming position. Regarding the aperture number, for example when the aperture stop is in an open condition which the defocusing tends to be conspicuous, it is possible to place emphasis on the focusing accuracy rather than the focusing speed by carrying out the AF operation which the focusing accuracy is emphasized more compared with a case that the aperture stop is in a small aperture condition. Regarding the imaging image quality, for example when a high quality image mode which the defocusing tends to be conspicuous is set for the imaging image quality, it is possible to place emphasis on the focusing accuracy rather than the focusing speed by carrying out the AF operation which the focusing accuracy is emphasized more compared with a case that a low image quality mode is set for the imaging image quality.

Next, a digital camera 100' will be described hereinafter as a modification of the digital camera 100.

The digital camera 100' is configured to be capable of varying the scanning range (the peripheral focusing range) which is the range to perform the movement of the group of focusing lenses 22 according to a condition such as the subject distance and the like in the CCDAF operation in step 8 (#8). More specifically, in the digital camera 100, although the above mentioned scanning range (XA−ΔX−XA+ΔX) which the AF controlling portion 83 sets only varies according to the result of the judgment of whether the ranging in step 5 (#5) is performed appropriately or not, in the digital camera 100', the scanning range in the CCDAF operation in step 8 (#8) also varies according to the result of the judgment on whether or not the subject is in the condition of mixed with the long and the short distances in step 6 (#6) and the result of the judgment of whether the subject is in the long distance in step 7 (#7), in addition to the variation of the scanning range in step 5 (#5).

Figure 5:
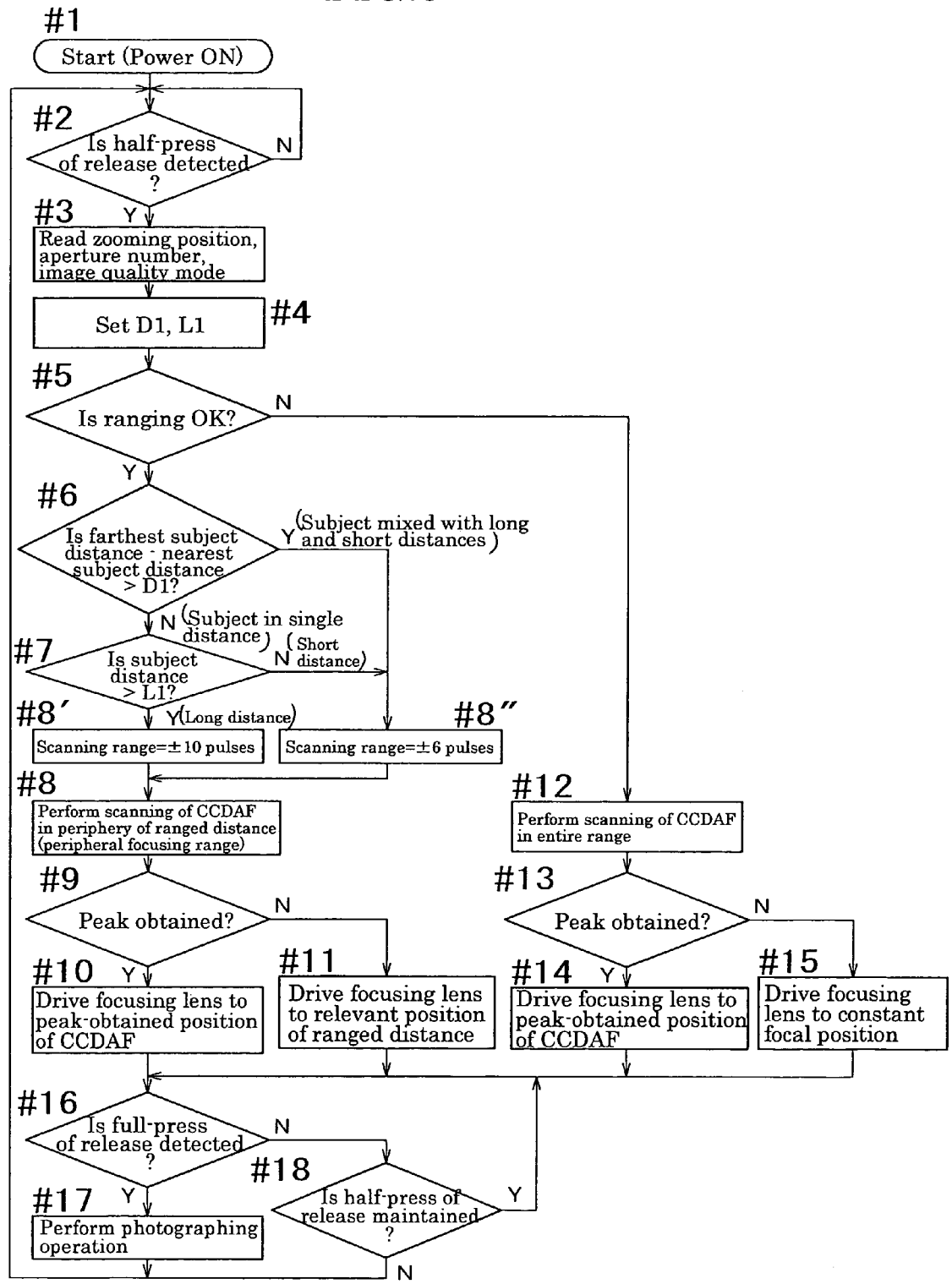
FIG. 5 is a flowchart representing a process of an AF control and executing of photographing in a modified digital camera.
Figure 6:
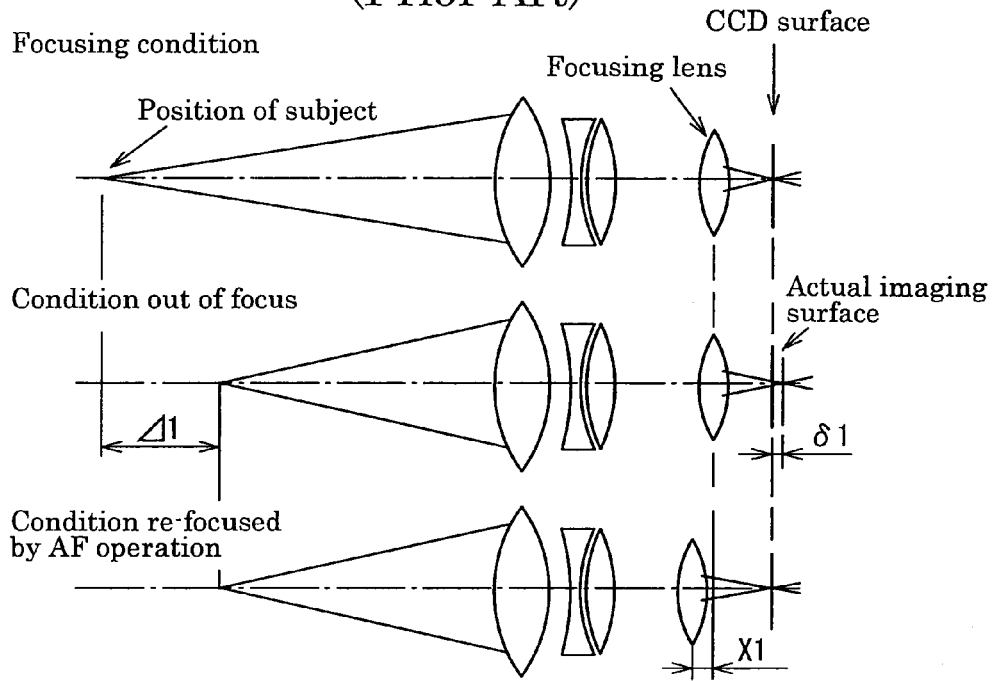
FIG. 6 is a diagram to explain a control of a width of a difference between a CCD surface and an actual imaging surface in an image inputting apparatus when a subject is in a long distance from the image inputting apparatus.
Figure 7:
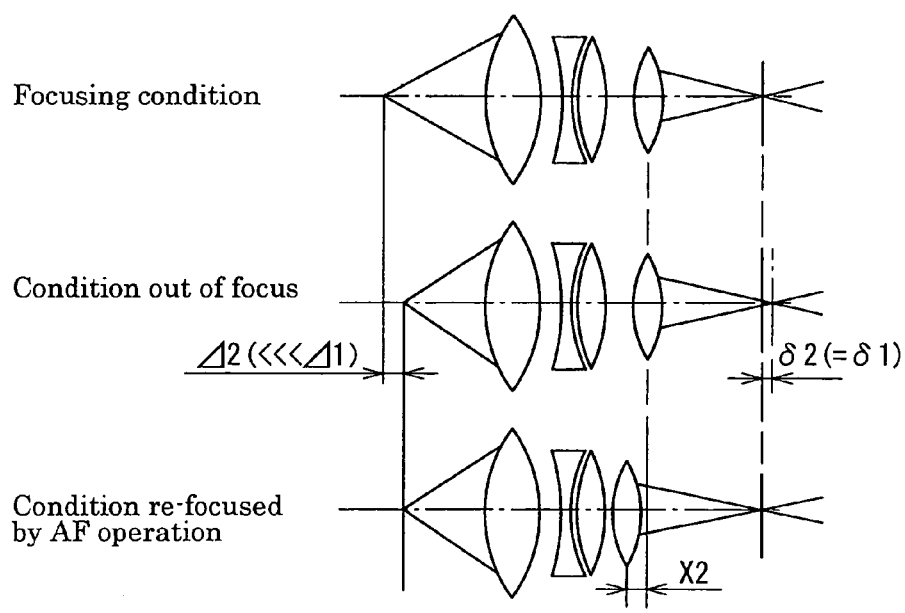
FIG. 7 is a diagram to explain the control of the difference width between the CCD surface and the actual imaging surface in the image inputting apparatus when the subject is in a short distance from the image inputting apparatus.

To explain the variation of the scanning range in the CCDAF operation carried out in step 8 (#8) by referring to FIG. 5, when the value of the difference between the maximum value and the minimum value is less than the predetermined value D1 within the plurality of distances to the each area in step 6 (#6), the AF controlling portion 83 determines that the subject is not in the condition of mixed with the long and the short distances, and thus judges whether or not the subject distance is more than the predetermined distance L1 (#7).

When the subject distance is more than the predetermined distance L1, the AF controlling portion 83 determines that the subject is in the long distance, and controls the CCDAF portion 82 so as to allow the CCDAF portion 82 to perform the CCDAF operation.

On the other hand, when the value of the difference between the maximum value and the minimum value is more than the predetermined value D1 in step 6 (#6), the AF controlling portion 83 determines that the subject is in the condition of mixed with the long and the short distances, and controls the CCDAF portion 82 so as to allow the CCDAF portion 82 to perform the CCDAF operation. Also, when the subject distance is less than the predetermined distance L1 in step 7 (#7), the AF controlling portion 83 determines that the subject is in the short distance, and controls the CCDAF portion 82 so as to allow the CCDAF portion 82 to perform the CCDAF operation.

At this time, the scanning range (the peripheral focusing range) in the case that the subject is not in the condition of mixed with the long and the short distances as well as the subject is in the long distance from the digital camera 100, is set to be wider compared with the case that the subject is in the condition of mixed with the long and the short distances or the case that the subject is in the short distance from the digital camera 100 (#8', #8"). The specific setting of the scanning range is carried out with the number of pulses M on which the distance of movement ΔX of the group of focusing lenses 22 depends. The number of pulses M when the subject is not in the condition of mixed with the long and the short distances as well as in the long distance is set ±10 pulses (#8'), and the number of pulses M when the subject is in the condition of mixed with the long and the short distances, or when the subject is in the short distance, is set ±6 pulses (#8").

However, the specific values defining the wideness and the narrowness of the scanning range are not limited to the number of pulses.

Therefore in step 8 (#8), the CCDAF portion 82 evaluates the contrast C of the image projected on the CCD 24 based on the image signal as moving the group of focusing lenses 22 with the scanning range set in step 8' (#8') or step 8" (#8").

Meanwhile, since the other steps are similar to the case in the digital camera 100, their explanations are omitted here by giving the same reference numerals.

In the digital camera 100' of the present modification, because the CCDAF portion 82 is controlled to carry out the evaluation in the peripheral focusing range of the focusing condition which corresponds to the subject distance obtained by the ranging sensor 31, a range which the CCDAF portion 82 scans to search for the predetermined focusing condition can be limited to the peripheral focusing range. Accordingly, it is possible to shorten a time taking for the AF operation.

In addition, because the wideness and the narrowness of the peripheral focusing range is set according to the subject distance, for example in a case that the subject is in the long distance from the digital camera 100' and thus the high focusing accuracy is required, it is possible to avoid an erroneous searching of the predetermined focusing condition by enhancing the focusing accuracy, by means of setting the peripheral focusing range scanned to search for the predetermined focusing condition wide and evaluating that peripheral focusing range. On the other hand, for example in a case that the subject is in the short distance from the digital camera 100' and thus the high focusing accuracy is not necessarily required, it is possible to shorten a time required for the searching by setting the peripheral focusing range which is to be scanned narrow and evaluating that peripheral focusing range.

Meanwhile, the AF controlling portion (controlling device) 83 may be provided not only to control the wideness and the narrowness of the focusing range which is an object when the CCDAF portion (first auto focusing device) 82 carries out the evaluation, but also to control a wideness and a narrowness of a range of movement of the photographic optical system 21 and the like which is moved by the focus driving system (focus driving device) 25, in addition to the controlling of the wideness and the narrowness of the focusing range.

In the case that the range of movement of the photographic optical system 21 and the like is set narrow by controlling the wideness and the narrowness of the focusing range as well as controlling the wideness and the narrowness of the photographic optical system 21 and the like simultaneously as stated above, a time taking for the movement of the photographic optical system 21 and the like can be shortened, thus it is possible to reduce a time-lag which is a time taking from beginning to completion of the AF operation.

Particularly, when the subject distance is more than the previously set predetermined distance L1, the focusing accuracy can be enhanced by setting the peripheral focusing range even wider and evaluating that peripheral focusing range compared with the case when the subject distance is less than the predetermined distance L1. Accordingly, even in a range that the high focusing accuracy is required, it is possible to carry out the AF operation with a sufficient accuracy that meets with the requirement of the high focusing accuracy.

Furthermore, because the CCDAF portion 82 is controlled to carry out the evaluation in the peripheral focusing range of the focusing condition which corresponds to the subject distance obtained by the ranging sensor 31, the range which the CCDAF portion 82 scans to search for the predetermined focusing condition can be limited to the peripheral focusing range. Accordingly, it is possible to shorten the time taking for the AF operation.

Also, because the wideness and the narrowness of the peripheral focusing range is set according to the presence or the absence of the subject mixed with the long and the short distances that is based on the distance to the each area, for example in the case that the subject is not in the condition of mixed with the long and the short distances and thus the high focusing accuracy is required, it is possible to avoid the erroneous searching of the predetermined focusing condition by enhancing the focusing accuracy, by means of setting the peripheral focusing range scanned to search for the predetermined focusing condition wide and evaluating that peripheral focusing range. On the other hand, for example in the case that the subject is in the condition of mixed with the long and the short distances and thus the high focusing accuracy is not necessarily required, it is possible to shorten the time required for the searching by setting the peripheral focusing range which is to be scanned narrow and evaluating that peripheral focusing range.

Particularly, when the subject is not in the condition of mixed with the long and the short distances, the focusing accuracy can be enhanced by setting the peripheral focusing range even wider and evaluating that peripheral focusing range compared with the case when the subject is in the condition of mixed with the long and the short distances. Accordingly, even in the range that the high focusing accuracy is required, it is possible to carry out the AF operation with the sufficient accuracy that meets with the requirement of the high focusing accuracy.

Meanwhile, it should be understood that the imaging apparatus of the present invention is not limited within the embodiments described above, and various embodiments can be employed with scopes described in claims.

For example, although it has been concretely explained that an active AF operation is carried out as the outside light AF in the present embodiments, the outside light AF may be carried out by a passive AF operation.

In addition, for example, the focus driving system 25 may be configured to drive the CCD 24 instead of driving the group of focusing lenses 22, by arranging the group of focusing lenses 22 fixedly and providing the CCD 24 to be capable of being moved in the direction of the optical axis of the photographic optical system 21.

Furthermore, as a timing for the ranging operation, a so-called continuous AF may be employed which constantly performs the ranging operation with a certain time interval when the power of the digital camera 100 or the digital camera 100' is "ON" state.

Also, the focus driving system 25 may be configured not only to drive only the group of focusing lenses 22 but also the entire photographic optical system 21.

Because the image inputting apparatus according to the present invention is structured as described above, the AF operation to appropriately acquire the accuracy according to the distance of the subject and the distance to each area of the subject can be carried out.

What is claimed is:

1. An image capturing apparatus, comprising:
a photographic optical system for projecting an image of a subject;
an imaging device for converting the projected image into an image signal and outputting it;
a focus driving device which changes a focusing condition of the image projected to said imaging device by relatively moving at least one of a part or an entire of said photographic optical system and said imaging device to the other;
a ranging device configured to measure a subject distance to said subject;
a first auto focusing device which is a charge coupled device auto focus (CCDAF) configured to obtain and evaluate sequentially an image signal according to each focusing condition changed by relatively moving at least one of a part or an entire of said photographic optical system and said imaging device, thereby obtaining a predetermined focusing condition based on an evaluation result on said image signal;
a second auto focusing device which is an auto focus (AF) including the ranging device configured to obtain a focusing condition according to said subject distance obtained by said ranging device; and
a controlling device for controlling an operation of said first auto focusing device, and
wherein said controlling device is configured to switch between said first auto focusing device and said second auto focusing device according to said subject distance obtained by said ranging device;
said controlling device is configured to carry out an evaluation in a peripheral focusing range of a focusing condition which corresponds to said subject distance obtained by said ranging device, and set said peripheral focusing range according to a comparison of a distance difference between a maximum distance to each part of the subject and a minimum distance to each part of the subject to a predetermined value D1, and said controlling device is configured to switch between said first auto focusing device and said second auto focusing device according to a presence or absence of a peak evaluation value $C_{max}$ in said peripheral focusing range.

2. The image capturing apparatus according to claim 1, wherein said controlling device sets said peripheral focusing range wider when said subject distance is more than a predetermined distance L1 and sets said peripheral focusing range narrower when said subject distance is less than said predetermined distance L1.

3. The image capturing apparatus according to claim 1, wherein said controlling device sets said peripheral focusing range wider when said distance difference is greater than said predetermined value D1 and sets said peripheral focusing range narrower when said distance difference is smaller than said predetermined value D1.

4. The image capturing apparatus according to claim 1, wherein said controlling device switches between said first auto focusing device and said second auto focusing device to operate said first auto focusing device when said distance difference is smaller than said predetermined value D1 and to operate said second auto focusing device when said distance difference is greater than said predetermined value D1.

5. The image capturing apparatus according to claim 1, wherein said controlling device drives said first auto focusing device to a focus position corresponding to said peak evaluation value $C_{max}$ when said peak evaluation value is $C_{max}$ is present, and drives said second auto focusing device to a constant focus position when said peak evaluation value $C_{max}$ is absent.

* * * * *